United States Patent
Robertson et al.

(10) Patent No.: US 10,294,960 B2
(45) Date of Patent: May 21, 2019

(54) FAN CASE ICE LINER FOR TURBOFAN ENGINE

(71) Applicant: UNITED TECHNOLOGIES CORPORATION, Farmington, CT (US)

(72) Inventors: Thomas J. Robertson, Glastonbury, CT (US); Steven Clarkson, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 312 days.

(21) Appl. No.: 15/032,161

(22) PCT Filed: May 23, 2014

(86) PCT No.: PCT/US2014/039360
§ 371 (c)(1),
(2) Date: Apr. 26, 2016

(87) PCT Pub. No.: WO2015/065526
PCT Pub. Date: May 7, 2015

(65) Prior Publication Data
US 2016/0258445 A1 Sep. 8, 2016

Related U.S. Application Data
(60) Provisional application No. 61/896,259, filed on Oct. 28, 2013.

(51) Int. Cl.
*F04D 29/52* (2006.01)
*F02C 7/05* (2006.01)
(Continued)

(52) U.S. Cl.
CPC .......... *F04D 29/522* (2013.01); *F01D 25/02* (2013.01); *F02C 7/047* (2013.01); *F02C 7/05* (2013.01);
(Continued)

(58) Field of Classification Search
None
See application file for complete search history.

(56) References Cited

U.S. PATENT DOCUMENTS

| | | | |
|---|---|---|---|
| 6,761,245 B2* | 7/2004 | Porte | F02C 7/045 |
| | | | 181/210 |
| 7,866,440 B2* | 1/2011 | Douglas | B64D 33/02 |
| | | | 181/210 |

(Continued)

FOREIGN PATENT DOCUMENTS

EP    2623725 A2    8/2013

OTHER PUBLICATIONS

International Search Report for International application No. PCT/US2014/039360; International filing date: May 23, 2014; dated Oct. 27, 2014; 3 pgs.

(Continued)

*Primary Examiner* — Justin D Seabe
*Assistant Examiner* — Juan G Flores
(74) *Attorney, Agent, or Firm* — Cantor Colburn LLP

(57) ABSTRACT

An ice liner assembly for a fan containment case for a turbofan gas turbine engine is disclosed. The disclosed ice liner assembly includes a plurality of arcuate panels arranged end to end to form a cylindrical liner that is disposed within the fan containment case and aft of the fan and abradable strip liner that circumscribes the fan. Because the plurality of arcuate panels are arranged end to end fashion, the ice liner assembly includes a plurality of splice joints, or a joint between two abutting ends of two arcuate (Continued)

panels. The splice joints are reinforced with molded polymeric splice support cores that are substantially lighter and less expensive than currently employed high density aluminum honeycomb core materials.

19 Claims, 3 Drawing Sheets

(51) Int. Cl.
  *F02C 7/047* (2006.01)
  *F01D 25/02* (2006.01)
  *F04D 29/02* (2006.01)
(52) U.S. Cl.
  CPC ........ *F04D 29/023* (2013.01); *F05D 2220/32* (2013.01); *F05D 2300/434* (2013.01); *F05D 2300/436* (2013.01); *F05D 2300/603* (2013.01)

(56) References Cited

U.S. PATENT DOCUMENTS

| | | |
|---|---|---|
| 2004/0045765 A1 | 3/2004 | Porte |
| 2004/0094359 A1* | 5/2004 | Porte ...................... B64D 33/02 181/214 |
| 2008/0135329 A1 | 6/2008 | Strunk et al. |
| 2011/0138769 A1 | 6/2011 | Costa et al. |
| 2011/0211943 A1 | 9/2011 | Belbeck et al. |
| 2012/0082541 A1* | 4/2012 | Macchia ............... F01D 21/045 415/200 |
| 2013/0195635 A1 | 8/2013 | Robertson, Jr. et al. |

OTHER PUBLICATIONS

International Written Opinion for International application No. PCT/US2014/039360; International filing dae: May 23, 2014; dated Oct. 27, 2014; 7 pgs.
European Search Report for Application No. EP 14 85 8095.

* cited by examiner

US 10,294,960 B2

FAN CASE ICE LINER FOR TURBOFAN ENGINE

TECHNICAL FIELD

This disclosure relates to fan containment case assemblies for turbo-machinery, such as gas turbine engines. More particularly, this disclosure relates to ice liners for fan containment cases that include a series of panels aligned end to end to form a cylindrical ring that is disposed aft of the fan. Still, more specifically, this disclosure relates to improved core structures disposed between a splice joint where two ice liner panels meet and the fan containment case.

DESCRIPTION OF THE RELATED ART

Gas turbine engines generally operate on the principle of compressing air within a compressor section of the engine, and then delivering the compressed air to the combustion section of the engine where fuel is added to the air and ignited. The resulting combustion mixture is delivered to the turbine section of the engine, where a portion of the energy generated by the combustion process is extracted by one or more turbines to drive one or more engine compressors. Turbofan gas turbine engines are widely used for high performance aircraft that operate at subsonic speeds. Turbofan gas turbine engines have a large rotary fan disposed at the front of the engine to produce thrust.

The rotary fan is circumscribed by a stationary fan containment case assembly that includes an outer case and a series of radially inwardly facing liners. Fan containment cases serve to channel incoming air through the fan to ensure that the bulk of the air entering the engine will be compressed by the fan. Fan containment cases may include a forward liner disposed in front of the fan, an abradable rub strip that surrounds the fan, an ice liner disposed aft of the fan and the rub strip, and a rear liner disposed aft of the ice liner.

Certain environmental conditions cause ice formation on the rotating fan blades and adjacent rotating components during engine operation. When this ice sheds, it is thrown radially outwardly and aft of the fan at high velocities by centrifugal forces and the flow of air through the fan. The ice impinges against the ice liner, which is disposed aft of the fan and the abradable rub strip and which faces radially inwardly from the outer case. Accordingly, these ice liners, or fan containment case liners disposed aft of the fan, must be strong enough to resist the high velocity impact of the ice.

Since turbofan engines power an aircraft in flight, the weight of the fan containment case, including the ice liner, is a significant factor affecting the overall weight and efficiency of the engine. Accordingly, it is difficult to make fan containment case liners, or more specifically, ice liners, that are lightweight, but still strong enough to avoid damage from the ice shed from the fan blades. As modern aircraft turbofan engines become larger, fan diameters become larger as do the diameters of the fan containment cases and the diameters of the ice liners. As a result, an ice liner is a structurally significant component, which significantly adds to the weight of the engine. In addition, increased engine weight decreases fuel efficiency.

Impact resistant ice liners typically include a series of panels, arranged end to end as they form a cylindrical liner aft of the fan and abradable rub strip. A core structure is typically disposed between the panels and the outer case. A splice joint is created where the ends of two panels meet. For example, if six panels form an ice liner, the six panels form six splice joints. Obviously, the number of panels used to form an ice liner can vary. While the core structure disposed between the ice panels and the outer case help to reinforce the panels of the ice liner, additional reinforcement at each splice joint is required.

To provide the required strength or reinforcement at the splice joints, dense aluminum honeycomb cores are disposed between the outer case and each splice joint. These dense aluminum honeycomb cores may also be flanked on either side by the regular core structures. Such dense aluminum honeycomb cores are expensive and heavy and significantly add to the overall weight of the ice liner.

To increase fuel and engine efficiency, there is a need for gas turbine engine components that are sufficiently strong, but lightweight. As a result, there is a need for fan containment case designs and ice liner designs that are lightweight, but strong enough to withstand impact from ice that is shed from the rotating fan blades.

SUMMARY OF THE DISCLOSURE

In one aspect, a liner for a fan containment case assembly is disclosed. The disclosed liner may include a plurality of arcuate panels arranged end to end to form a cylinder with a plurality of splice joints. Each splice joint is formed by an end of one panel abutting an end of another panel. The liner further includes a plurality of splice support cores. Each splice support core engages and is disposed radially outside one of the splice joints. Further, the splice support cores may be formed from a molded polymer.

In another aspect, an ice liner assembly for a fan containment case assembly is disclosed. The ice liner assembly may include a plurality of arcuate panels arranged end to end to form a cylinder with a plurality of splice joints. Each splice joint is formed by an end of one panel abutting and end of another panel. The ice liner assembly may further include a plurality of splice support cores. Each splice support core may engage and be disposed radially outside one of the splice joints. The ice liner assembly may further include a plurality of standard support cores. Each standard support core may be disposed radially outside one of the arcuate panels and be circumferentially between two of the splice support cores. Further, the splice support cores may include a molded polymer selected from a group consisting of polyetherimide (PEI), polyimide, polyether ether ketone (PEEK), polycarbonate (PC), polyether ketone ketone (PEKK), polysulfone, Nylon, polyphenylsulfide, reinforced polyetherimide, reinforced polyimide, reinforced PEEK, reinforced PC, reinforced PEKK, reinforced polysulfone, reinforced Nylon, reinforced polyphenylsulfide, and combinations thereof.

In yet another aspect, a fan containment case assembly is disclosed. The fan containment case assembly may include a cylindrical outer case and a plurality of liners disposed radially inside the outer case. The plurality of liners may include a front cylindrical liner, an ice liner assembly, and abradable strip liner between the front liner and the ice liner, and a rear liner opposite the ice liner from the abradable strip liner. The ice liner assembly may include a plurality of arcuate panels arranged end to end to form a cylinder with a plurality of splice joints. Each splice joint may be formed by an end of one panel abutting an end of another panel. The ice liner assembly may further include a plurality of splice support cores. Each splice support core may engage and be disposed radially between one of the splice joints and the outer case. The ice liner assembly may further include a plurality of standard support cores. Each standard support core may be disposed radially between one of the arcuate panels and the outer case and circumferentially between two of the splice support cores. Further, the splice support cores may include a molded polymer selected from the group consisting of polyetherimide (PEI), polyimide, polyether ether ketone (PEEK), polycarbonate (PC), polyether ketone ketone (PEKK), polysulfone, Nylon, polyphenylsulfide, reinforced polyetherimide, reinforced polyimide, reinforced PEEK, reinforced PC, reinforced PEKK, reinforced polysulfone, reinforced Nylon, reinforced polyphenylsulfide, and combinations thereof.

In any one or more of the embodiments described above, the splice support cores may be injection molded or compression molded. Further, in any one or more of the embodiments described above, the splice support cores may include reinforcing fibers or particles such as carbon fibers, carbon particles, fiber glass and combinations thereof.

In any one or more of the embodiments described above, the splice support cores may include and inner end that faces radially inwardly towards one of the splice joints and an outer end that faces radially outwardly, or towards the outer case. Further, each splice support core may further include a plurality of ribs that extend between the inner and outer ends thereof. In a further refinement of this concept, the splice support cores may include a pair of sidewalls that flank the plurality of ribs and that also extend between the inner and outer ends of the splice support core. In a further refinement of this concept, the sidewalls and ribs may be arranged substantially parallel to each other. In a further refinement, the inner and outer ends of the splice support cores may include inner and outer walls were in the ribs and sidewalls may extend between and be connected to the inner and outer walls.

In any one or more of the embodiments described above, the splice support cores may include a plurality of reinforcing ribs that intersect each other. In a further refinement of this concept, the splice support cores may include a pair of sidewalls that flank the plurality of ribs in were each rib is extends between and is connected to each of the pair of sidewalks.

Other advantages and features will be apparent from the following detailed description when read in conjunction with the attached drawings.

BRIEF DESCRIPTION OF THE DRAWINGS

For a more complete understanding of the disclosed methods and apparatuses, reference should not be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
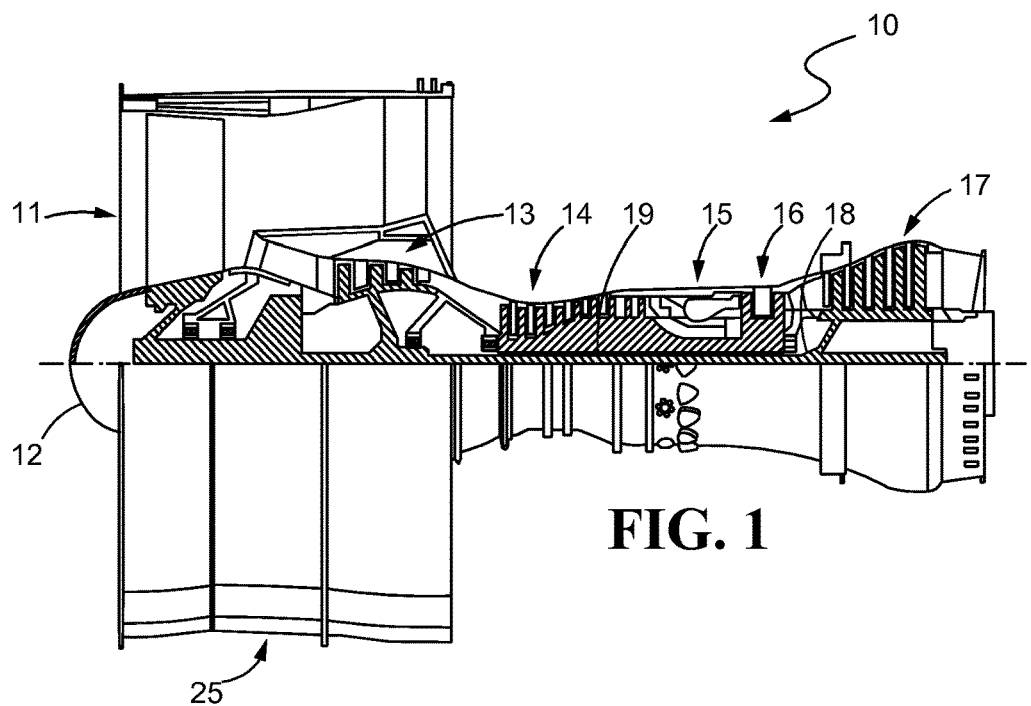
FIG. 1 is a sectional view of a turbofan gas turbine engine.

Turning to FIG. 1, a turbofan gas turbine engine 10 is shown in a sectional view and which includes a rotating fan 11 that is mounted on a nose 12 and coupled to a low pressure compressor 13. The low pressure compressor 13 is disposed between the fan 11 and a high pressure compressor 14. The high pressure compressor 14 is disposed between the low pressure compressor 13 and a combustor 15. The combustor 15 is disposed between a high pressure turbine 16 and the high pressure compressor 14. The high pressure turbine 16 is disposed between the combustor 15 and a low pressure turbine 17. The low pressure turbine 17 is coupled to a low pressure shaft or spool 18 which, in turn, drives the fan 11 and the low pressure compressor 13. The high pressure turbine 16 is coupled to a high pressure tubular shaft or spool 19 which, in turn, drives the high pressure compressor 14.

Figure 2:
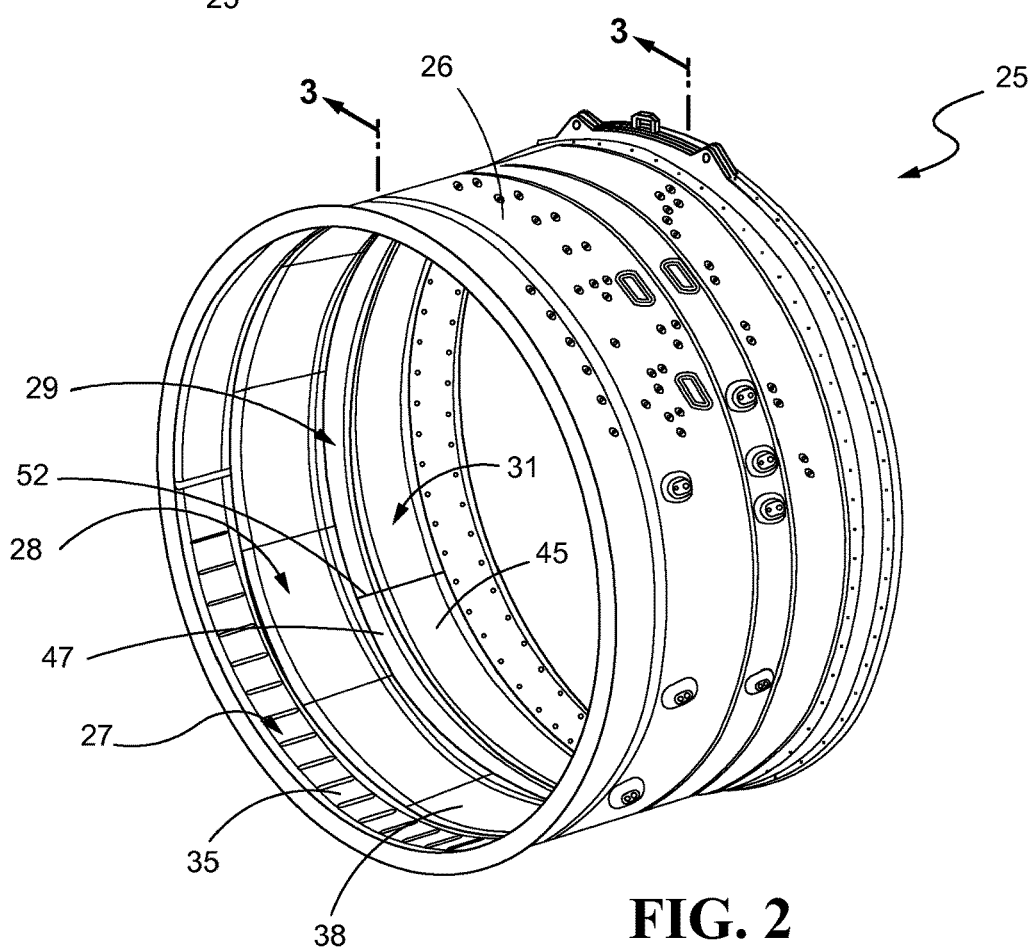
FIG. 2 is a perspective view of a fan containment case assembly of the gas turbine engine of FIG. 1.

Still referring to FIG. 1, the fan 11 and low pressure compressor 13 are disposed within a fan containment case assembly 25, which is also shown in FIG. 2. The fan containment case assembly 25 includes an outer case 26 and a series of liners, including a front liner 27, an abradable rub strip liner 28, an ice liner assembly 29 and a rear liner 31. All four liners 27, 28, 29, 31 are also illustrated in the sectional view of FIG. 3.

Figure 3:
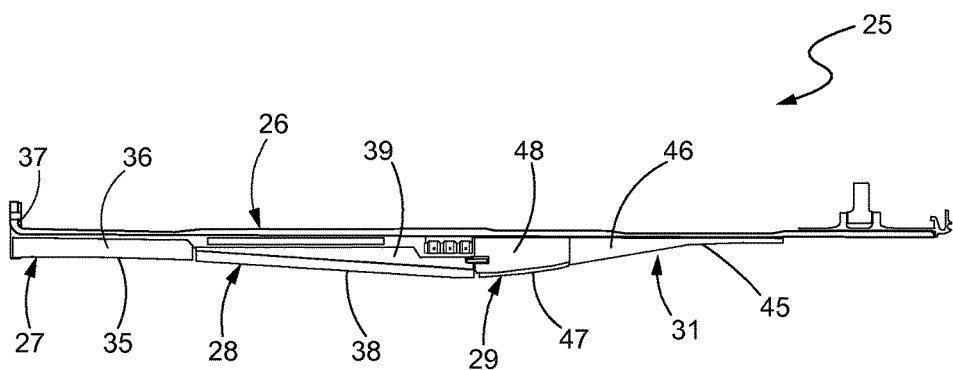
FIG. 3 is a sectional view of the fan containment case assembly of FIG. 2.

Turning to FIG. 3, the front liner 27 includes a series of outer panels 35 and a core 36 that is sandwiched between the outer panels 35 and the forward end 37 of the outer case 26. Similarly, the abradable rub strip liner 28 includes a series of abradable rub strip panels 38 that are also supported by a core structure 39 that are sandwiched between the outer case 26 and the abradable rub strip panels 38. Similarly, the rear liner 31 also includes a series of rear liner panels 45 that are reinforced by another core 46 that is sandwiched between the rear liner panel 45 and the outer case 26.

Figure 4:
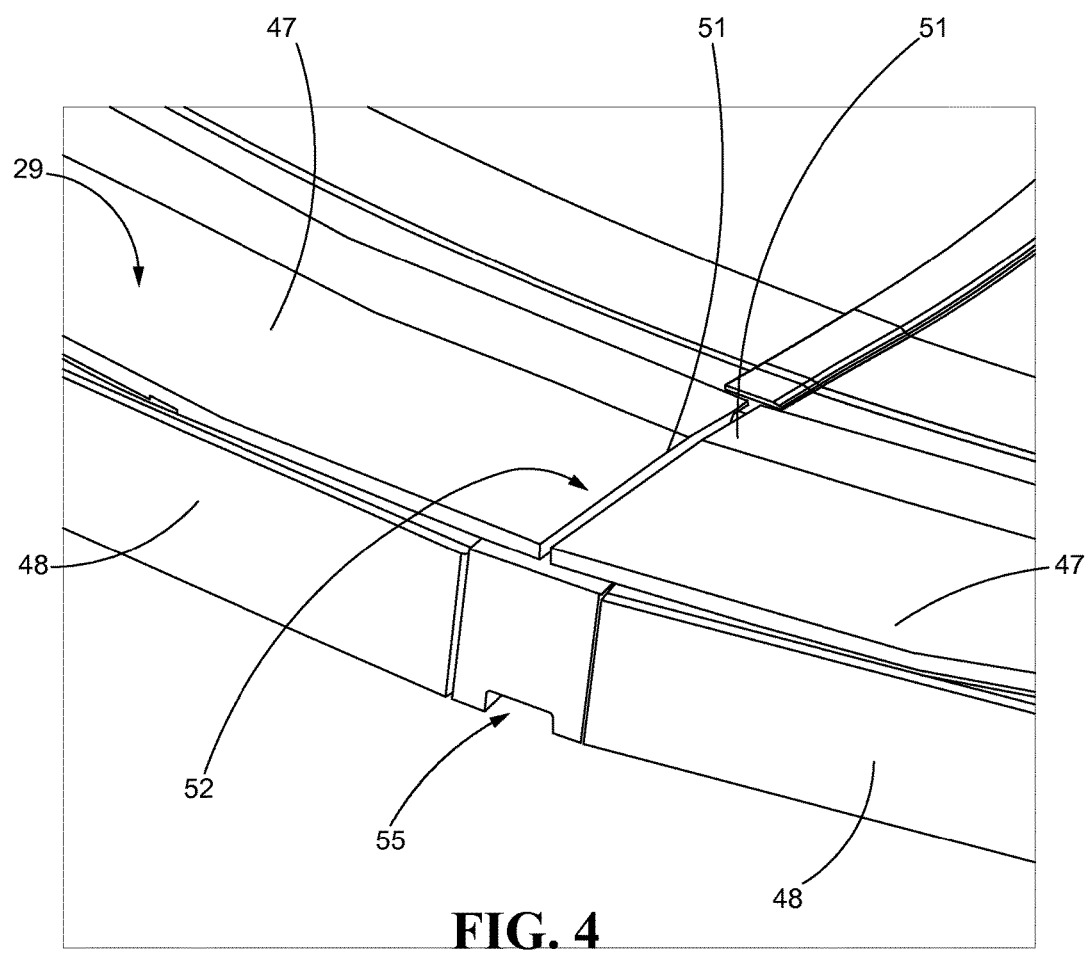
FIG. 4 is a partial and enlarged perspective view of the ice liner assembly of the fan containment case assembly shown in FIGS. 2 and 3.

Turning to the ice liner assembly 29 shown in FIGS. 3 and 4, the ice liner panel assembly 29 also includes a series of arcuate panels 47 arranged end to end to form a cylindrical structure that is reinforced by a standard core 48. Turning to FIG. 4, two ice liner arcuate panels 47 are shown that each have an end 51 that meet and form a splice joint 52. The splice joints 52 present a weakened point or area of the ice liner assembly 29. Hence, standard core 48 is not sufficiently strong to support or reinforce a splice joint 52. Further, the ice liner assembly 29 includes a plurality of splice joints 52. For example, the ice liner assembly 29 may include six arcuate panels 47 that form six splice joints 52. The six splice joints 52 are weaker than middle portions of the arcuate panel 47 and therefore require stronger reinforcement than provided by the standard cores 48. Therefore, instead of standard cores 48 being disposed between the splice joints 52 and the outer case 26, splice support cores 55 are disposed between the splice joints 52 and the outer case 26. The splice support cores 55 must be strong enough to sufficiently reinforce the splice joints 52 when the splice joints 52 are struck by high velocity ice.

Figure 5:
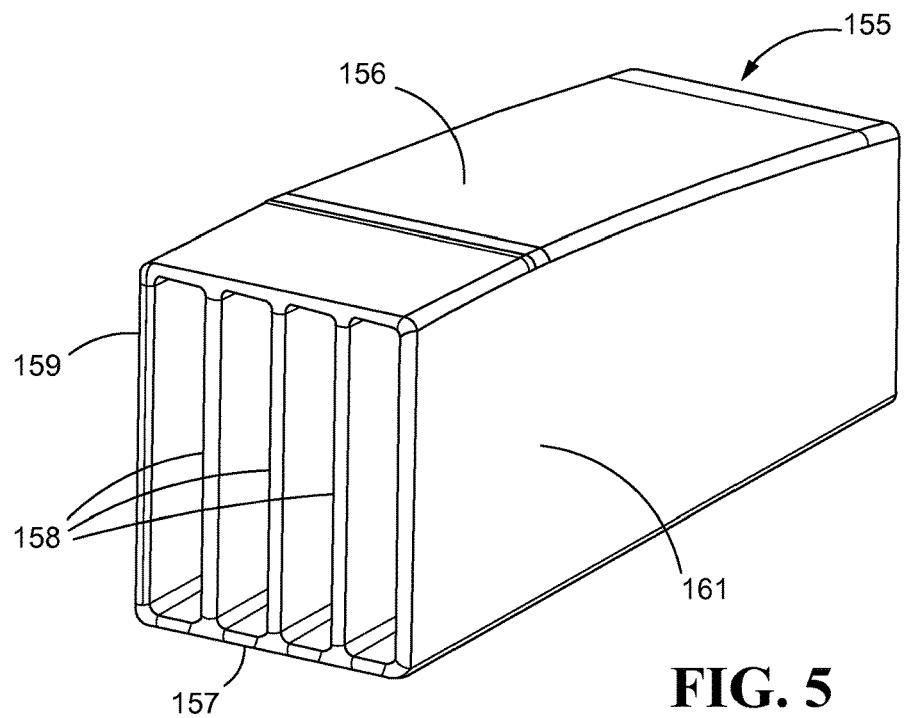
FIG. 5 Is a perspective view of one disclosed splice support core.
Figure 6:
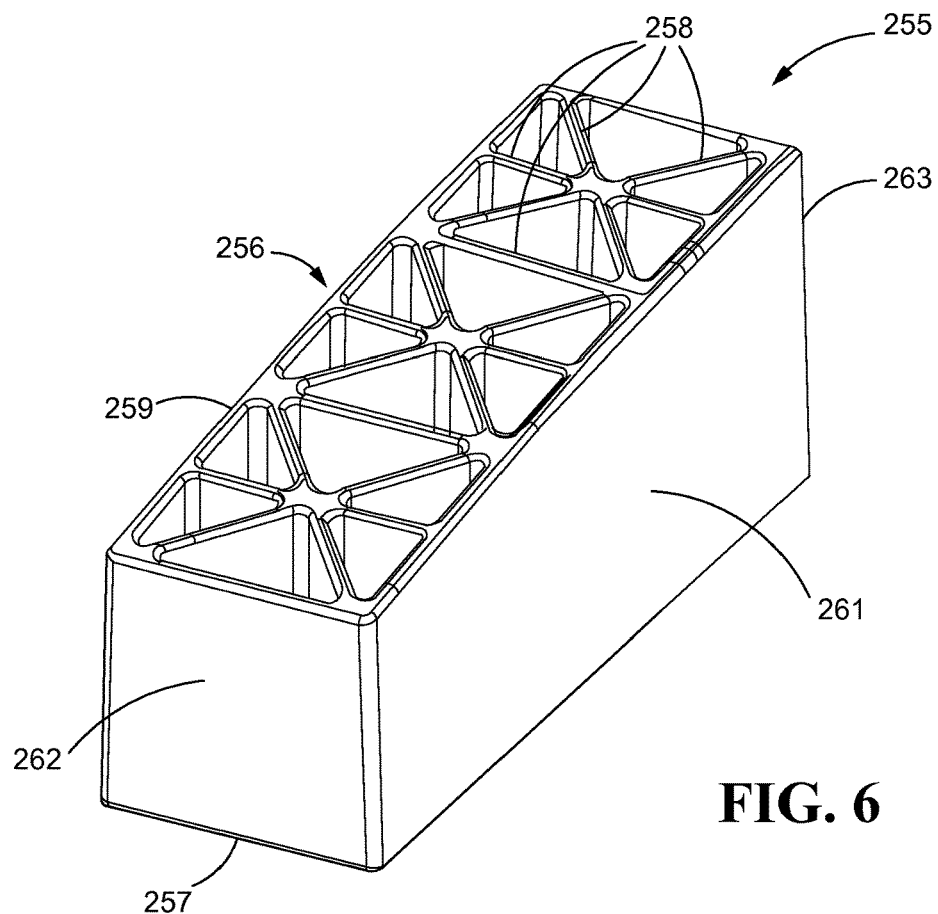
FIG. 6 is a perspective view of another disclosed splice support core.

Currently, splice joints 52 are reinforced by high density aluminum honeycomb cores. However, high density aluminum core honeycomb are both expensive and heavy, thereby adding to both the cost and weight of the engine 10. Because of high fuel cost, fuel efficiency of gas turbine engines 10 is critical. Because fuel efficiency can be increased by decreasing the weight of the engine 10, it is desirable to design parts for gas turbine engines 10 that are lighter than conventional or currently employed parts. Two examples of disclosed splice support cores 155, 255 are illustrated in FIGS. 5 and 6. Heavy high density aluminum honeycomb cores may be replaced by molded polymeric cores 155, 255.

Turning to FIG. 5, the splice support core 155 includes an outer end 156, an inner end 157 and a plurality of reinforcing ribs 158 extending between the outer end 156 and inner end 157. In addition, the splice support core 155 may also include a pair of side walls 159, 161 that flank the reinforcing ribs 158. In the splice support core 155 shown in FIG. 5, the ribs 158 and side walls 159, 161 are generally parallel in configuration.

In contrast, the splice support core 255 of FIG. 6 also includes an outer end 256, an inner end 257 and a plurality of intersecting ribs 258 that extend between the outer end 256 and the inner end 257. In the configuration shown in FIG. 6, three groups of intersecting ribs 258 are utilized. The splice support core 255 may also include side walls 259, 261, a front wall 262 and a rear wall 263. The side walls 259, 261, the front wall 262 and the rear wall 263 may also perform the reinforcing function of the ribs 258.

The splice support cores 155, 255 may be fabricated from a variety of polymeric materials including, but not limited to polyetherimide (PEI), polyimide, polyether ether ketone (PEEK), polycarbonate (PC), polyether ketone ketone (PEKK), polysulfone, Nylon, polyphenylsulfide, reinforced polyetherimide, reinforced polyimide, reinforced PEEK, reinforced PC, reinforced PEKK, reinforced polysulfone, reinforced Nylon, reinforced polyphenylsulfide, and combinations thereof. The polymeric material may be reinforced with carbon fibers, carbon particles, fiber glass, and other reinforcing particles or short fibers that would be apparent to those skills in the art. The splice support cores 155, 255 may be injection molded or compression molded. If a compression molding technique is utilized, the polymeric material may be reinforced with long carbon fibers or fiber glass in the form of continues long fibers or chopped tape.

INDUSTRIAL APPLICABILITY

Improved ice liner assemblies 29 for fan containment case assemblies 25 are disclosed. The improved ice liner assemblies 29 are reinforced at each splice joint by a molded polymeric splice support core 155, 255 that is substantially lighter than the currently employed dense aluminum honeycomb core materials used to reinforce splice joints of a conventional fan case ice liner. The disclosed splice support cores 155, 255 provide the necessary stiffness to the splice joints 52 and prevent edge damage during ice impact. However, the disclosed splice support cores 155, 255 are lighter and less expensive than conventional dense aluminum honeycomb cores. The disclosed splice support cores 155, 255 may be injection or compression molded from a variety of materials and may also be reinforced with particle, fibers or other reinforcing materials as will be apparent to those skilled in the art. The disclosed splice support cores 155, 255 include stiffening ribs 158, 258 that extend radially. In addition to reducing weight and cost, the use of polymeric splice support cores 155, 255 prevents any galvanic action between the cores 155, 255 and the metallic materials used to form the outer case 26. Thus, the use of polymeric splice support cores 155, 255 eliminates the need to anodize and/or bond prime and, as a result of eliminating these processes, the disclosed splice support cores 155, 255 provide a green alternative to existing high density aluminum honeycomb cores.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A liner for a fan containment case assembly, the liner comprising:
    a plurality of arcuate panels arranged end to end to form a cylinder with a plurality of splice joints, each splice joint formed by an end of one panel abutting an end of another panel;
    a plurality of splice support cores, each splice support core engaging and being disposed radially outside of one of the splice joints;
    the splice support cores comprising a molded polymer; and
    wherein the liner further includes a plurality of standard support cores, each standard support core being disposed radially outside one of the arcuate panels and between two of the splice support cores.

2. The liner of claim 1 wherein the splice support cores are injection molded.

3. The liner of claim 2 wherein the injection molded polymer of the splice support cores includes reinforcing fibers.

4. The liner of claim 3 wherein the reinforcing fibers are selected from the group consisting of carbon fibers, fiberglass and combinations thereof.

5. The liner of claim 2 wherein the injection molded polymer of the splice support cores includes reinforcing particles.

6. The liner of claim 5 wherein the particles are selected from the group consisting of carbon particles, fiberglass particles and combinations thereof.

7. The liner of claim 1 wherein the splice support cores are compression molded.

8. The liner of claim 1 wherein at least one of the splice support cores includes an inner end that faces radially inwardly towards one of the splice joints and an outer end the faces radially outwardly, each splice support core further includes a plurality of ribs extending between the inner and outer ends thereof.

9. The liner of claim 8 wherein at least one of the splice support cores includes a pair of sidewalls that flank the plurality of ribs and that also extend between the inner and outer ends thereof.

10. The liner of claim 9 wherein the sidewalls and ribs are arranged substantially parallel to each other.

11. The liner of claim 10 wherein the outer end of at least one of the splice support cores includes an outer wall, the inner end of at least one of the splice support cores includes an inner wall, and
    the ribs and sidewalls extend between and are connected to the inner and outer walls.

12. The liner of claim 8 wherein the plurality of ribs includes groups of ribs that intersect each other.

13. The liner of claim 12 wherein at least one of the splice support cores includes
    a pair of sidewalls that flank the plurality of ribs and wherein each rib extends between and is connected to each of the pair of sidewalls.

14. The liner of claim 1 wherein the polymer is selected from the group consisting of: polyetherimide (PEI); polyimide; polyether ether ketone (PEEK); polycarbonate (PC); polyether ketone ketone (PEKK); polysulfone; Nylon; polyphenylsulfide; reinforced polyetherimide; reinforced polyimide; reinforced PEEK; reinforced PC; reinforced PEKK; reinforced polysulfone; reinforced Nylon; reinforced polyphenylsulfide; and combinations thereof.

15. An ice liner assembly for a fan containment case assembly, the ice liner assembly comprising:
   a plurality of arcuate panels arranged end to end to form a cylinder with a plurality of splice joints, each splice joint formed by an end of one panel abutting an end of another panel;
   a plurality of splice support cores, each splice support core engaging and being disposed radially outside of one of the splice joints;
   a plurality of standard support cores, each standard support core being disposed radially outside one of the arcuate panels and between two of the splice support cores;
   the splice support cores including a molded polymer selected from the group consisting of polyetherimide (PEI), polyimide, polyether ether ketone (PEEK), polycarbonate (PC), polyether ketone ketone (PEKK), polysulfone, Nylon, polyphenylsulfide, reinforced polyetherimide, reinforced polyimide, reinforced PEEK, reinforced PC, reinforced PEKK, reinforced polysulfone, reinforced Nylon, reinforced polyphenylsulfide, and combinations thereof.

16. The ice liner assembly of claim 15 wherein at least one of the splice support cores includes an inner end that faces radially inwardly towards one of the splice joints and an outer end the faces radially outwardly, each splice support core further includes a plurality of ribs extending between the inner and outer ends thereof.

17. The ice liner assembly of claim 16 wherein the ribs are arranged substantially parallel to each other.

18. The ice liner assembly of claim 16 wherein the plurality of ribs includes groups of ribs that intersect each other.

19. A fan containment case assembly, comprising:
   a cylindrical outer case;
   a front cylindrical liner disposed inside the outer case;
   an ice liner assembly disposed inside the outer case;
   an abradable strip liner disposed inside the outer case and between the front liner and the ice liner;
   a rear liner disposed inside the outer case and opposite the ice liner from the abradable strip liner;
   the ice liner assembly including a plurality of arcuate panels arranged end to end to form a cylinder with a plurality of splice joints, each splice joint formed by an end of one panel abutting an end of another panel;
   the ice liner assembly further including a plurality of splice support cores, each splice support core engaging and being disposed radially between one of the splice joints and the outer case;
   the ice liner assembly further including a plurality of standard support cores, each standard support core being disposed radially between one of the arcuate panels and the outer case and circumferentially between two of the splice support cores;
   the splice support cores including a molded polymer selected from the group consisting of polyetherimide (PEI), polyimide, polyether ether ketone (PEEK), polycarbonate (PC), polyether ketone ketone (PEKK), polysulfone, Nylon, polyphenylsulfide, reinforced polyetherimide, reinforced polyimide, reinforced PEEK, reinforced PC, reinforced PEKK, reinforced polysulfone, reinforced Nylon, reinforced polyphenylsulfide, and combinations thereof.

* * * * *